E. B. LA MARCHE AND A. APPEL.
DRAFT ATTACHMENT FOR AUTOMOBILES.
APPLICATION FILED NOV. 8, 1917.

1,303,920.

Patented May 20, 1919.
2 SHEETS—SHEET 1.

Inventors
Edward B. La Marche,
and Alfred Appel,

By
Attorney

UNITED STATES PATENT OFFICE.

EDWARD B. LA MARCHE AND ALFRED APPEL, OF MARLETTE, MICHIGAN.

DRAFT ATTACHMENT FOR AUTOMOBILES.

1,303,920.  Specification of Letters Patent.  Patented May 20, 1919.

Application filed November 8, 1917. Serial No. 200,894.

*To all whom it may concern:*

Be it known that we, EDWARD B. LA MARCHE and ALFRED APPEL, citizens of the United States, residing at Marlette, in the county of Sanilac and State of Michigan, have invented certain new and useful Improvements in Draft Attachments for Automobiles, of which the following is a specification.

This invention relates to a draft attachment for use in assisting automobiles in climbing steep hills and in moving "stalled" automobiles.

It is a desideratum to provide a device of this nature which is removable and may be readily applied to practically all types of automobiles; one in which the automobile engine serves as the source of power and in which the draft or pull is central; one having a driving section and windlass or winding section adapted to be maintained in operative relation with each other and with the engine by clamp means; and to provide the detailed constructions, combinations and arrangements of parts such as will be hereinafter described in connection with the accompanying drawings, illustrating one preferred embodiment, and in which:—

Figure 1:
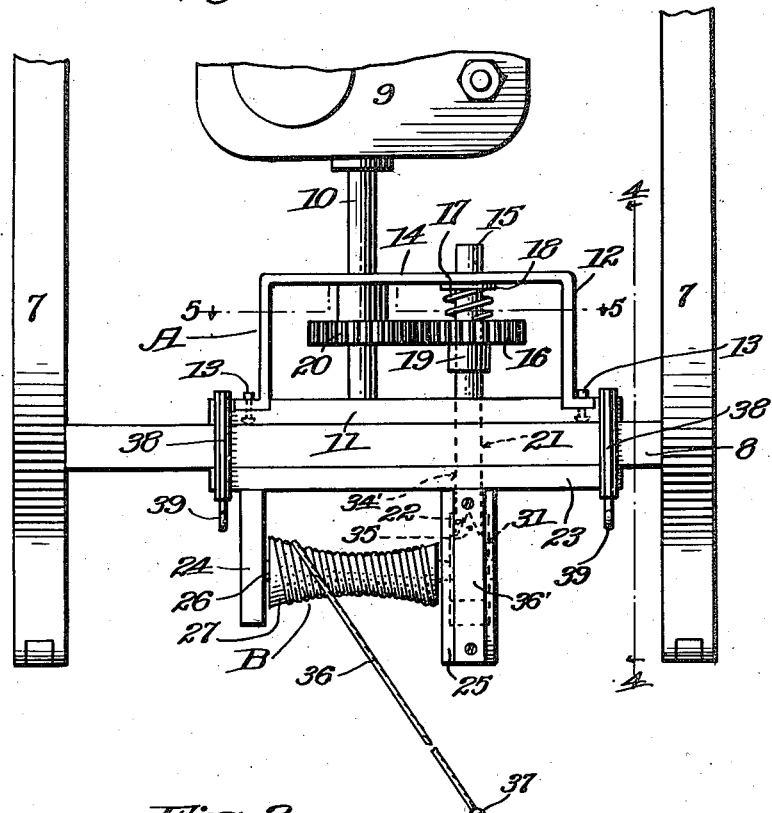
Figure 1 is a plan view of our improved draft attachment associated with automobile parts.
Figure 2:
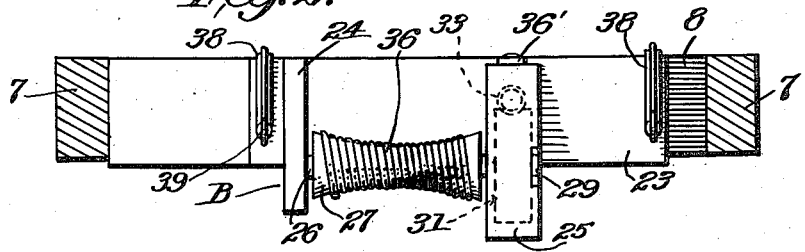
Fig. 2 is a view showing our draft attachment in front elevation and in connection with automobile parts.

Referring specifically to the drawings, an automobile chassis has been fragmentarily illustrated for the purpose of explaining the attachment and operation of our improvement. Of this chassis, numerals 7 designate the side beams which are bridged by the front end beam at 8. The automobile engine is shown at 9 and has the usual power or crank shaft 10. It is to be understood that these parts are shown merely by way of example.

We principally provide two sections namely a driving section A and a winding or windlass section B. Section A has a base 11 to which is fastened a bracket or bearing 12 fastened thereto as by means of bolts 13 and which bracket has a portion 14 parallel with the base 11 but spaced therefrom. Slidably and turnably mounted in the portion 14 and in the base 11, is a shaft 15 on which a gear wheel 16 is keyed. A coil spring 17 surrounds shaft 15 and bears against the portion 14 or a washer 18 which may be mounted on shaft 15. The coil spring 17 normally urges the gear wheel 16 toward the base 11. The movement of the shaft toward said base is limited, however, by the engagement of a fixed collar or abutment 19 on the shaft 15 which abuts the base. Gear wheel 16 is adapted to be driven in any suitable manner from the engine shaft 10, for instance, by a gear wheel 20 keyed thereon and which meshes with the gear wheel 16.

Figure 3:
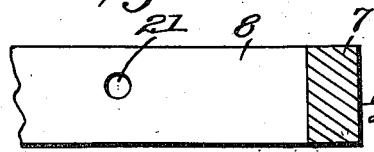
Fig. 3 is a fragmentary view of an automobile chassis and particularly illustrating an opening which is provided in the front end beam to facilitate attachment of our improvements.
Figure 4:
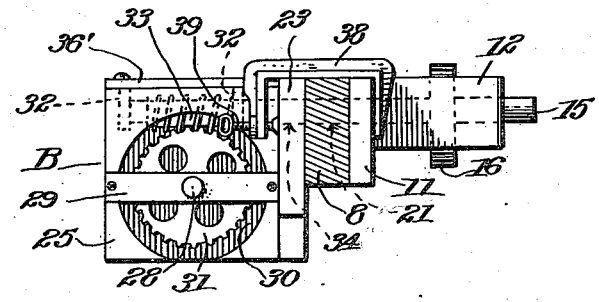
Fig. 4 is a sectional view on the line 4—4 of Fig. 1.

Shaft 15 extends through an opening 21 provided in the beam 8, as shown in Figs. 1 and 3, and said shaft extends beyond the beam and terminates in a bifurcated clutch portion 22.

The windlass section B is disposed in front of the beam 8 and it has a base 23 from which bearings 24 and 25 extend outwardly to journal a shaft 26 of a drum or windlass proper 27. Shaft 26 is elongated as at 28 so that it may be mounted in a bearing bar 29 fastened to the bearing 25 as well shown in the gear 4. Bearing 25 is cut away as at 30 and in the recess, a gear wheel 31 operates, being keyed to the portion 28 of shaft 26. Suitable bearings 32 mount a worm 33 within the bearing 25 so that the worm may mesh with the gear wheel 31. Opening 21 registers with an opening 34 extending into the base 23 and the bearing 25. One end of the worm 33 extends into opening 34' and is pointed as at 35 to form a clutch portion to extend into the clutch portion 22 and be driven through the rotation of shaft 15. To reinforce bearing 25, a bar 36 may be fastened thereto.

Around the windlass 27, a suitable cable 36' may be wound and which cable at one end is fastened to the windlass and at the other end may be fastened to a stake or other stationary object 37.

Clamps 38 of suitable U-shape, may be employed to maintain the bases 11 and 23 against the bar or beam 8. These clamps may be of any conventional form and preferably have adjusting or tightening screws 39.

Figure 5:
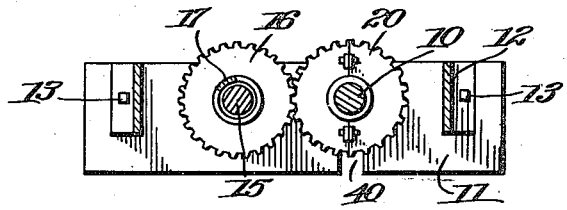
Fig. 5 is a sectional view through the driving section alone, on the line 5—5 of Fig. 1.

It may be mentioned that gear wheel 20 can be of any suitable construction to facilitate its connection to the shaft 10. For instance, it may be, although not necessarily, of the split type as best shown in Fig. 5. Also, to facilitate disposition of the driving section A, base 11 may be cut away or notched as at 40 so that shaft 10 may extend thereinto.

Figure 6:
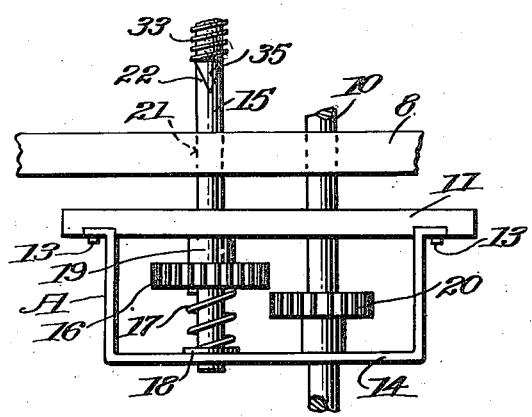
Fig. 6 is a fragmentary view showing the driving section in position relative to the front end beam of the chassis before being clamped thereto.

Our improvements are of such a nature that they may be normally free and not attached to the automobile. Should the automobile become stalled or greater power be necessary in climbing, the sections A and B are then attached to the beam 8 and in operative relation with the gear wheel 20. Section A is brought into the relation with beam 8 shown in Fig. 6 where the shaft extends through the opening 21 and where the base 11 rests on the crank shaft 10. Thus the section A is supported from the machine. Section B may now be assembled so that the shaft portion 15 will extend into the opening 34 and the clutch portions 22 and 35 will interengage. The clamps 38 may now be applied and the screws 39 tightened so as to draw bases 11 and 23 into engagement with the beam 8, thus bringing gear wheel 16 into mesh with gear wheel 20 and compressing spring 17 so that it will serve to maintain the clutch portions 22 and 35 in engagement. Previously or after the operation suggested, the cable 36 may be attached to a stake 37 or to another stationary object. Upon operation of the engine thereafter, gear wheel 20 will drive gear wheel 16, shaft 15, worm 33, gear wheel 31, and drum 27, winding the cable 36 and as a result moving the automobile forward. After the attachment has served the purpose intended, the clamps 38 and sections 50 A and B may be removed from the vehicle.

Having thus described our invention what we claim is:—

1. A draft attachment for automobiles having a driving section with a bearing, a shaft slidable relatively to the bearing, a gear wheel on said shaft, a spring intermediate the gear wheel and bearing, means cooperating with the gear wheel to drive it from the engine, a draft means, and means to secure said bearing in a position compressing said spring and maintaining the shaft in driving relation with the draft means.

2. A draft attachment for an automobile having a beam, a windlass section having a drum, a bearing therefor, a gear wheel for the windlass, a worm meshing with said gear wheel having a clutch portion, a driving section, means to clamp both of said sections to said beam, said driving section having a bearing, a shaft slidably mounted on the driving section extending across and beyond the beam and having a clutch portion to engage said clutch portion of the worm, a gear wheel on said shaft, a spring intermediate the bearing and gear wheel compressible through the clamping of the driving section to maintain the clutch portion in engagement and means to drive said gear wheel from the engine of the automobile.

In testimony whereof we affix our signatures in the presence of two witnesses.

EDWARD B. LA MARCHE.

Witnesses:
 EDMUND J. BULLOCK,
 JAMES ADAMS.

ALFRED APPEL.

Witnesses:
 WELLINGTON BEAVER,
 HUGH C. MORRIS.